US007005482B2

(12) United States Patent
Guse et al.

(10) Patent No.: US 7,005,482 B2
(45) Date of Patent: Feb. 28, 2006

(54) SELF-SUPPORTING REACTIVE HOT-MELT ADHESIVE ELEMENT

(75) Inventors: Dieter Guse, Löhne (DE); Theodor Hippold, Bad Salzuflen (DE); Christian Terfloth, Detmold (DE)

(73) Assignee: Jowat Lobers und Frank GmbH & Co. KG, Detmold (DE)

( * ) Notice: Subject to any disclaimer, the term of this patent is extended or adjusted under 35 U.S.C. 154(b) by 0 days.

(21) Appl. No.: 10/071,042

(22) Filed: Feb. 8, 2002

(65) Prior Publication Data

US 2002/0164486 A1    Nov. 7, 2002

(30) Foreign Application Priority Data

Feb. 12, 2001   (DE)   ................... 101 06 630

(51) Int. Cl.
    *C08G 18/80*   (2006.01)
(52) U.S. Cl. .................. 525/440; 528/45; 528/59; 528/905; 156/331.7
(58) Field of Classification Search ............. 528/45, 528/905, 59; 525/440
    See application file for complete search history.

(56) References Cited

U.S. PATENT DOCUMENTS

| | | | |
|---|---|---|---|
| 3,951,919 A | | 4/1976 | Pinfold et al. |
| 4,302,351 A | * | 11/1981 | Gras et al. ............. 252/182.21 |
| 4,888,124 A | | 12/1989 | Blum et al. |
| 5,166,300 A | * | 11/1992 | Rumon et al. |
| 5,189,096 A | * | 2/1993 | Boutillier et al. ............. 525/56 |
| 5,710,215 A | * | 1/1998 | Abend ........................ 525/124 |
| 5,883,217 A | * | 3/1999 | Werenicz et al. |
| 5,977,283 A | * | 11/1999 | Rossitto et al. |
| 6,087,463 A | * | 7/2000 | Tada et al. |
| 6,348,548 B1 | | 2/2002 | Abend |
| 6,376,038 B1 | | 4/2002 | Schutz |

FOREIGN PATENT DOCUMENTS

| | | |
|---|---|---|
| DE | 42 12 139 C1 | 5/1993 |
| DE | 195 41 923 A1 | 5/1997 |
| DE | 100 34 637 A1 | 4/2004 |
| EP | 0 922 720 A1 | 6/1999 |
| WO | 91/14727 | * 10/1991 |
| WO | WO 93/25599 A | 12/1993 |
| WO | 99 58590 | 11/1999 |

OTHER PUBLICATIONS

G. Woods; ICI Polyurethanes; 1990; p. 32.*

* cited by examiner

*Primary Examiner*—Rachel Gorr
(74) *Attorney, Agent, or Firm*—Cohen Pontani Lieberman & Pavane

(57) ABSTRACT

A self-supporting reactive hot-melt adhesive element of a reactive one-component hot-melt adhesive which is solid at room-temperature. The adhesive element comprises at least one isocyanate being solid or liquid at room-temperature; and at least one isocyanate-reactive polymer and/or resin being solid at room-temperature. Also disclosed is a process of producing said adhesive element as well as its application and use, in particular in a hot-melt adhesive bonding process.

22 Claims, No Drawings

SELF-SUPPORTING REACTIVE HOT-MELT ADHESIVE ELEMENT

BACKGROUND OF THE INVENTION

1. Field of the Invention

The present invention relates to a self-supporting reactive hot-melt adhesive element comprising a one-component hot-melt adhesive, a process for its manufacture and its application and use. In addition, the present invention relates to an adhesive bonding or joining process for the permanent bonding or joining of parts or substrates.

2. Description of the Related Art

There are numerous hot-melt adhesives available. In particular in industrial applications, users routinely "tailor" or adapt these adhesives dependent on specific applications. For example, in the woodworking industry, in particular in the furniture industry, it is known to provide fiber plates with a coating, e.g. a veneer or a laminate, via adhesive bonding, wherein particularly thermoplastic hot-melt adhesives or moisture-reactive polyurethane hot-melt adhesives are used.

However, in numerous applications, the use of thermoplastic hot-melt adhesives is problematical, because these hot-melt adhesives show a low moisture and heat stability. In this regard, moisture-reactive polyurethane hot-melt adhesives show distinct improvements.

However, the disadvantage to moisture-reactive polyurethane hot-melt adhesives is that they can only be stored in complex packaging, in particular to the exclusion of atmospheric humidity, and have to be processed quickly after the packaging is opened.

By contrast, when using two-component adhesive systems, the disadvantage is that they must first be mixed prior to use and then processed quickly. In this case, the risk in particular is one of dosing errors.

The disadvantage to using hot-melt adhesives in particular is that in part very complicated melting-on and application devices are required, the operation and cleaning of which are associated with a considerable outlay of time and work.

For this reason, substrates are also routinely bonded using adhesive tape. However, the disadvantage to adhesive tapes is that they do not form as stable an adhesive bond as reactive hot-melt adhesives, and are always applied to a support element from which they must be separated before use.

WO 99/19413 describes a packaging for such a conventional adhesive tape with a support, wherein the support element in the form of sheets or strips has an adhesive layer, in particular a hot-melt adhesive layer, and the adhesive tape packaging has separate strip sections, whose adjacent edges are formed by notches, which cut through the support layer, but not the adhesive layer. The significant disadvantage to this adhesive tape is also that it must first be removed from the support layer prior to use.

THE INVENTION

In view of the prior art described above, one object of the present invention is to provide a reactive hot-melt adhesive element that does not require a support element.

Another object of the present invention is to provide a reactive hot-melt adhesive element that can be easily stored and further processed, while having excellent adhesive properties. In particular, it should be possible to use such a reactive hot-melt adhesive material without any complicated melt-on and/or application devices.

Another object of the present invention is to provide a reactive hot-melt adhesive element that in particular has a high moisture and heat stability.

According to the present invention the above objects can be achieved by means of a self-supporting reactive hot-melt adhesive element according to claim 1, said self-supporting reactive hot-melt adhesive element comprising a reactive one-component hot-melt adhesive which is solid at room-temperature and comprises:

(i) at least one isocyanate being solid or liquid at room-temperature; and (ii) at least one isocyanate-reactive polymer and/or resin being solid at room-temperature.

The isocyanate-reactive polymer and/or resin preferably forms a room-temperature-solid matrix into which the isocyanates are embedded. In other words, the isocyanates are distributed homogenously over the reactive polymer and/or resin matrix.

Surprisingly, it was shown that the isocyanates being solid or liquid at room-temperature, if homogenously embedded into the reactive matrix, have such a reduced reactivity relative to the isocyanate-reactive functional groups of the polymer and/or resin matrix at room-temperature, in particular relative to hydroxyl groups and also water, that the freshly prepared hot-melt adhesive melt can be processed for example into granules, e.g. via underwater granulation.

According to the present invention, aliphatic and/or aromatic, di- and/or polyfunctional isocyanates can be used as isocyanates being solid or liquid at room-temperature, in particular those with free terminal isocyanate groups/functions (NCO-groups/functions).

Examples of suitable isocyanates according to the present invention include diisocyanatodiphenylmethanes (MDIs), in particular 4,4'-diisocyanatodiphenylmethane and 2,4'-diisocyanateodiphenylmethane, and mixtures of various diisocyanatodiphenylmethanes; 1,5-diisocyanatonaphthalene (NDI); diisocyanatotoluenes (TDIs), in particular 2,4-diisocyanatotoluene, as well as TDI-urethdiones, in particular dimeric 1-methyl-2,4-phenylene-diisocyanate (TDI-U) and TDI-carbamides; 1-isocyanato-3-isocyanatomethyl-3,5,5-trimethylcyclohexane (IPDI) and its isomers and derivatives, in particular di-, tri- and polymerisates, as well as IPDI isocyanurate (IPDI-T); 3,3'-dimethylbiphenyl-4,4'-diisocyanate (TODI); 3,3'-diisocyanato-4,4'-dimethyl-N,N'-diphenylcarbamide (TDIH); as well as mixtures and prepolymers of the aforementioned compounds.

According to a particular embodiment of the present invention a mixture of at least two aliphatic and/or aromatic di- and/or polyisocyanates which are solid or liquid at room-temperature is used as the isocyanate component, wherein at least one of said di- and/or polyisocyanates in this mixture is an unsymmetrically substituted di- and/or polyisocyanate comprising isocyanate functions of different reactivity, i.e. isocyanate functions of lower and higher reactivity. An example for such an unsymmetrically substituted di- and/or polyisocyanate comprising isocyanate functions of different reactivity is 2,4'-diisocyanato-diphenylmethane where the NCO-function in 2-position has a lower reactivity than the NCO-function in 4'-position, above all due to steric hindrance. This has the advantage that only the NCO-function with higher reactivity reacts with isocyanate-reactive polymer and the NCO-function with lower reactivity remains mainly unreacted in the inventive reactive hot-melt adhesive element so that said unreacted NCO-function provides free NCO-functions in the inventive reactive hot-melt adhesive element and thus remains available for the cross-linking process.

Especially preferred according to the present invention as the isocyanate component is a mixture of 4,4'-diisocyanatodiphenylmethane and 2,4'-diisocyanatodiphenylmethane, preferably with a content of 2,4'-diisocyanatodiphenylmethane exceeding 20% w/w, in particular exceeding 30% w/w, preferably exceeding 40% w/w, especially preferred exceeding 50% w/w, based on the isocyanate mixture. The advantage to using 2,4'-diisocyanatodiphenylmethane—alone or in mixture with another isocyanate—is that the NCO-group in the 2-position, compared to the NCO-group in the 4'-position, is relatively inert, and hence is present in a relatively stable form in the reactive hot-melt adhesive element according to the present invention for a longer period of time. One example for a suitable mixture according to the present invention of 4,4'-diisocyanatodiphenylmethane and 2,4'-diisocyanatodiphenylmethane is the room-temperature-liquid product mixture sold by Bayer AG under the tradename Desmodur® VP KA 8616. Using the mixtures specified above consisting of 4,4'-diisocyanatodiphenylmethane and 2,4'-diisocyanatodiphenylmethane in the reactive hot-melt adhesive element according to the present invention yields a product that already cross-links at room-temperature during exposure to moisture, wherein the cross-linking process is activated or accelerated by exposure to heat, and exposure to heat is required for adhesive processes (heat-adhesiveness/heat-stickiness). This results in products according to the present invention (i.e. reactive hot-melt adhesive elements) with a lower reactivity and higher selectivity.

According to a particular embodiment of the present invention, the isocyanate can be a masked or blocked isocyanate, which splits off the blocking or masking groups, in particular during exposure to heat and/or moisture. Blocked or masked isocyanates of this kind are known to the skilled practitioner from prior art. The skilled practitioner will select suitable blocked or masked isocyanates according to the present invention based on the respective application or use.

According to another, particular embodiment of the present invention, the isocyanate can be a so-called encapsulated or surface-deactivated isocyanate, i.e. an isocyanate with retarded reactivity.

Encapsulated or surface-deactivated isocyanates are well-known to the skilled practitioner from prior art. For example, reference can be made to EP 0 204 970 A2 or the corresponding U.S. Pat. No. 4,888,124, to WO 99/58590 A1 or the corresponding DE 198 20 270, and also to EP 0 922 720 A1, the disclosures of which are hereby incorporated by reference. Surface-deactivation can take place by dispersing a powdery solid isocyanate into a solution of the deactivating agent, by introducing a melted isocyanate into a solution of the deactivating agent in an insoluble liquid dispersing agent, or by adding the deactivating agent or a solution of the deactivating agent to a dispersion of the solid, finely dispersed isocyanates or vice-versa. Used in particular as deactivating or encapsulating agents are compounds with hydrophilic groups, e.g. in particular amino groups or hydroxyl groups, which can react with free isocyanate groups of the isocyanate, and hence form a type of surface sheath or encapsulation on the isocyanates, which initially deactivates the isocyanates (e.g. amines, diamines, polyamines, alcohols, diols, polyols or the corresponding thio-compounds).

In particular, the type and quantity of deactivating or encapsulating agent selected within according to of the present invention is such that the encapsulation or surface-deactivation is broken up preferably at temperatures exceeding room-temperature, in particular at temperatures between 60° C. and 160° C.

In general, the isocyanates for manufacturing the reactive hot-melt adhesive element according to the present invention are used in quantities of 0.5 to 30% w/w, based on the reactive hot-melt adhesive element.

According to the present invention, the content of free NCO-groups in the reactive hot-melt adhesive element is at least 0.5% w/w, in particular at least 1% w/w, preferably at least 1.5% w/w, especially preferred at least 2% w/w, based on the reactive hot-melt adhesive element.

In particular, the isocyanate-reactive polymer and/or resin is selected in such a way that it comprises at least two isocyanate-reactive functional groups per molecule, in particular hydroxyl, amino, carboxyl and/or carbonamide groups.

In particular, the reactive polymer and/or resin is selected in such a way that it comprises at least two isocyanate-reactive H-atoms per molecule.

It has proven particularly advantageous for the isocyanate-reactive polymer and/or resin to have an average molecular weight exceeding 8,000 g/mol, in particular 10,000 to 50,000 g/mol, preferably of 10,000 to 30,000 g/mol.

The isocyanate-reactive polymer generally comprises a thermoplastic isocyanate-reactive polymer, i.e. a polymer which is thermoplastic below the temperature at which it then cross-links with the isocyanate.

Examples for isocyanate-reactive polymers and/or resins according to the present invention include isocyanate-reactive polyesters, polycaprolactone polyesters, polyethers, polyurethanes, polyamides, polytetrahydrofuranes, polyacrylates and polymethacrylates, as well as their copolymers and mixtures, in particular each having at least two isocyanate-reactive functional groups or isocyanate-reactive hydrogen atoms per molecule. Preferred examples are hydroxyfunctional polyethers or polyesters, i.e. polyetherdiols or polyetherpolyols and polyesterdiols or polyesterpolyols.

In general, the content of isocyanate-reactive polymer and/or resin is 20 to 90% w/w relative to the reactive hot-melt adhesive element.

As mentioned above, the isocyanate-reactive polymer and/or resin and the isocyanate are homogeneously intermixed, in particular by embedding the isocyanate in the matrix formed by the isocyanate-reactive polymer and/or resin.

In addition, it is advantageous for the one-component hot-melt adhesive of the self-supporting, reactive hot-melt adhesive element according to the present invention to additionally contain at least one catalyst. This catalyst is preferably homogeneous distributed over the isocyanate-reactive polymer and/or resin matrix or embedded therein.

Suitable catalysts according to the present invention include catalysts such as those common and known from polyurethane chemistry, in particular organic tin compounds, e.g. dibutyl tin dilaurate (DBTL), or alkylmercaptide compounds of dibutyl tin, or organic iron, lead, cobalt, bismuth, antimony and zinc compounds and mixtures thereof, or catalysts based on amines ("amine catalysts"), e.g. tertiary amines or DABCO (1,4-diazabicyclo-[2,2,2]-octane, triethylene diamine, TEDA), or DMDEE (dimorpholinodiethyl ether).

In general, the amount of catalyst, relative to the reactive hot-melt adhesive element according to the present invention, is up to 5% w/w, in particular between 0.01 and 5% w/w.

In addition, it is possible for the reactive hot-melt adhesive element according to the present invention to also comprise non-reactive, i.e. non-isocyanate-reactive polymers, waxes and/or resins. These are preferably also homogeneously distributed over the matrix formed by the isocyanate-reactive polymer and/or resin.

Suitable non-isocyanate-reactive polymers, waxes and/or resins according to the present invention include aliphatic, cyclic or cycloaliphatic hydrocarbon resins, terpene phenol resins, cumarone indene resins, α-methylstyrene resins, polymerized liquid resin esters or ketonaldehyde resins. In this case, preference is given in particular to resins with low acid values, preferably values less than 1 mg KOH/g.

Non-isocyanate-reactive polymers according to the present invention can also be ethylene/vinyl acetate polymers or copolymers, in particular those with vinyl acetate contents of between 12 and 40% w/w, preferably 18 to 28% w/w, relative to the polymer or copolymer, and/or with melt indexes (MFIs, DIN 53735) of 8 to 800, preferably 150 to 500.

However, non-isocyanate-reactive polymers according to the present invention can also include polyolefins, in particular with average molecular weights of 5,000 to 25,000 g/mol, preferably 10,000 to 20,000 g/mol, and/or with ring and ball softening ranges of between 80 and 170° C., preferably between 80 and 130° C.

Non-isocyanate-reactive polymers according to the present invention also include (meth)acrylates such as styrene(meth)acrylates.

Non-isocyanate-reactive waxes according to the present invention also include polyolefin waxes, in particular polyethylene and polypropylene waxes, along with waxes modified on this basis.

According to a preferred embodiment of the present invention, the non-isocyanate-reactive polymers, waxes and/or resins together with the isocyanate-reactive polymers and/or resins form a matrix into which the isocyanates and, if necessary, the other constituents of the reactive hot-melt adhesive element according to the present invention are embedded or incorporated. In other words, according to this embodiment, the non-isocyanate-reactive polymers, waxes and/or resins on the one hand, and the isocyanate-reactive polymers and/or resins on the other together form a matrix for the remaining constituents (contents) of the reactive hot-melt adhesive element according to the present invention.

The amount of non-isocyanate-reactive polymers, waxes and/or resins can be up to 60% w/w, relative to the reactive hot-melt adhesive element.

In addition, it is possible for the reactive hot-melt adhesive element to contain at least one isocyanate-reactive, mono-functional additive.

Suitable mono-functional additives according to the present invention include mono-functional amines, alcohols or mercaptans or other mono-functional additives with an isocyanate-reactive functional group.

The content of isocyanate-reactive, mono-functional additives can be up to 20% w/w, relative to the reactive hot-melt adhesive element.

In addition, it is possible for the reactive hot-melt adhesive element according to the present invention to also contain additives to improve heat conductivity and/or sensitivity to radiation induction, in particular relative to microwave and high-frequency radiation. The advantage to this is that, in the heat-inducing cross-linking process, in particular via microwave or high-frequency irradiation, the input energy can be used particularly efficiently.

Suitable additives according to the present invention for improving the heat conductivity and/or sensitivity to radiation induction, in particular relative to microwave and high-frequency radiation, include powdered metals, in particular silver, or heat-conductive polymers like polyaniline or graphite or soot.

The content of additives for improving heat conductivity and/or sensitivity to radiation induction, in particular relative to microwave and high-frequency radiation, can be up to 25% w/w relative to the reactive hot-melt adhesive element, and generally is between about 1 and 25% w/w, preferably between about 5 and 20% w/w.

In addition, the reactive hot-melt adhesive element according to the present invention can contain common additives and aids, e.g. softeners or additives that assist in plasticization, oils, antioxidants, anti-ageing agents, acid-trapping agents, fillers, optical brighteners, dyes, color pigments etc.

As explained above, the individual constituents (contents) of the reactive hot-melt adhesive element according to the present invention are preferably embedded into each other in homogeneous distribution.

One advantage of the present invention is that the reactive hot-melt adhesive element according to the present invention is self-supporting. For this reason, it requires no support, which in particular simplifies application in an adhesion process. The self-supporting nature of the reactive hot-melt adhesive element according to the present invention stems from the fact that it consists of a room-temperature-solid, reactive one-component hot-melt adhesive as described above. However, the reactive hot-melt adhesive element may optionally be applied to a suitable support (e.g. made out of siliconized paper).

According to the present invention, the term "room-temperature" denotes a temperature of 20° C. at atmospheric pressure and relative atmospheric humidity of 65%.

Another advantage of the present invention is that the reactive hot-melt adhesive element according to the present invention is non-sticky or non-adherent at room-temperature, and only becomes sticky or adherent at temperatures exceeding room-temperature, preferably at temperatures of 60° C. to 160° C. In other words, the reactive hot-melt adhesive element according to the present invention is not sticky on the surface at room-temperature, but becomes sticky during exposure to warmth and heat. Based on these properties of the reactive hot-melt adhesive element according to the present invention, no additional cover layer or releasable separation layer is required for covering the adhesive layer (=sticky or adhesive layer), i.e. the reactive hot-melt adhesive element according to the present invention can be used for bonding as such, i.e. without having to remove a support or release paper prior to application.

The reactive hot-melt adhesive element according to the present invention generally begins to cross-link after briefly warmed above room-temperature, in particular to temperatures of 60° C. to 160° C., and hence to form a stable adhesive joint or permanent adhesive bond between the joined parts or substrates.

When using liquid isocyanates or isocyanate mixtures, the reactive hot-melt adhesive element according to the present invention generally begins to cross-link at temperatures of about 60° C., while cross-linking sets in at higher temperatures when using solid isocyanates or isocyanate mixtures, i.e. generally starting at about 100° C.

In order to cross-link, the individual contents of the reactive hot-melt adhesive element according to the present invention are generally melted together. In particular, the term "melt" according to the present invention implies that the contents are converted into a viscous or flowing state.

Both the isocyanates and the solid matrix, and, if present, the remaining optional constituents must be melted for the melting process in the case of solid isocyanates and isocyanate mixtures, while only the matrix and, if present, the remaining constituents need to be melted in the case of liquid isocyanates and isocyanate mixtures.

In particular in the case of the solid isocyanates and isocyanate mixtures, the duration of cross-linking is less than 10 minutes, in particular less than 5 minutes, at temperatures ranging from 100° C. to 160° C.

By contrast, when the cross-linking process has been initiated via heating to temperatures above room-temperature, in particular 100° C. to 160° C., followed by immediate cooling to room-temperature, the duration of cross-linking generally lasts for about 5 to 8 days at room-temperature, in particular in the case of the solid isocyanates and isocyanate mixtures.

As explained above, the reactive hot-melt adhesive element in particular is designed to cross-link during exposure to heat and/or moisture.

As described above, it was surprisingly shown that the solid or liquid isocyanates embedded in the reactive polymer or resin matrix have such a low reactivity at room-temperature that the reactive hot-melt adhesive element can be stored without any problem. At room-temperature and 65% relative atmospheric humidity, the reactive hot-melt adhesive element according to the present invention remains stable in storage for at least 1 month, in particular at least 2 months, and preferably at least 3 months. Stable in storage means in particular that the softening range (Kofler hot stage) of the hot-melt adhesive element according to the present invention remains constant over the indicated period, so that one conclude that no or substantially no cross-linking has taken place.

Depending on the application, the reactive hot-melt adhesive element according to the present invention can be designed as a foil, film, strip or reactive "adhesive tape". In particular, it can be wound into a roll. In this case, it is advantageous to store the reactive hot-melt adhesive element wound into a roll in a cassette, in particular to prevent contact with moisture or water, and hence further improve stability in storage.

The layer thickness of the reactive hot-melt adhesive element according to the present invention generally ranges from 10 $\mu$m to 1,000 $\mu$m, in particular from 50 $\mu$m to 500 $\mu$m, preferably from 100 $\mu$m to 300 $\mu$m.

The reactive hot-melt adhesive element according to the present invention generally shows a certain degree of expandability (elasticity), preferably both longitudinally and transversely. In addition, it is flexible at the thicknesses specified above. These properties facilitate ease of use.

According to a particular embodiment, the reactive hot-melt adhesive element according to the present invention contains the following constituents or contents in homogeneous distribution and in the specified parts by weight, which each relate to the reactive hot-melt adhesive element:

Isocyanates, as defined above, in a quantity of 0.5 to 30% w/w;

Isocyanate-reactive polymers and/or resins, as defined above, in a quantity of 20 to 90% w/w;

Optionally, isocyanate-reactive non-functional additives, as defined above, in quantities of up to 20% w/w;

Optionally, non-isocyanate-reactive polymers, waxes and/or resins, as defined above, in quantities of up to 60% w/w;

Optionally, catalysts, as defined above, in a quantity of up to 5% w/w, in particular 0.01 to 5% w/w;

Optionally, additives for improving heat conductivity and/or sensitivity to radiation induction, as defined above, in a quantity of up to 25% w/w, in particular 1 to 25% w/w, preferably 5 to 20% w/w;

Optionally, common additives and aids, as defined above.

Another object of the present invention is a process for manufacturing or producing the reactive hot-melt adhesive element according to the present invention, said process being characterized by the following steps:

Mixing the individual constituents (contents), as defined above, in particular while mildly heating, but without a (notable) reaction between the individual constituents (contents) taking place in the case of the solid isocyanates;

If necessary, letting the resulting mixture cool and/or harden/cure;

Processing the homogeneous mass (=reactive one-component hot-melt adhesive) fabricated in this way to a film, if necessary while mildly heating to above room-temperature, but without a (notable) between the individual constituents (contents) taking place;

If necessary, letting the films obtained in this way cool to room-temperature; and finally, If necessary, processing further, in particular dimensioning (e.g. into films or foils, smaller pieces etc.) and/or winding into rolls.

The individual constituents (contents) of the reactive hot-melt adhesive element according to the present invention can be mixed in an extruder, for example. As an alternative, however, a conventional mixer can be used.

Processing into films can be done using methods familiar to the skilled person. For example, the mixture of the individual constituents (contents) can be pressed through a slot nozzle. In addition, for example, it is possible to stretch out the mass and subsequently roll and/or stretch it out, if necessary.

In particular, the reactive hot-melt adhesive element according to the present invention can be used to permanently join or to permanently adhesively bond adhesives of all type together. In other words, the reactive hot-melt adhesive element according to the present invention can be used in particular in an adhesive bonding process, preferably a hot-melt adhesive process (e.g. for the permanent joining or adhesive bonding of parts or substrates of any kind, in particular those made out of wood and/or plastic). For cross-linking purposes, the individual constituents (contents) of the reactive hot-melt adhesive element according to the present invention are generally melted on or melted together.

During adhesive bonding, in particular while applying pressure, the individual melted or flowing constituents (contents) of the reactive hot-melt adhesive element according to the present invention are mixed together, thereby initiating cross-linking by contacting the isocyanates and isocyanate-reactive polymers and/or resins and, if necessary, the catalyst.

For example, a reactive hot-melt adhesive element according to the present invention designed as a reactive "adhesive tape" can be used to adhesively bond an edge band to a particleboard/fiberboard in the woodworking industry, for example. The advantage here is that the reactive hot-melt adhesive according to the present invention is highly resistant to heat and moisture, without having to use any intricate packaging. Another advantage is that only so much adhesive as required at the time must be melted. Complicated melt and application equipment is not required; consequently, there is also no need for any involved cleaning of premelt devices, as is required in prior art, since hot-melt adhesives also tend to incinerate due to the constant exposure to high temperatures.

In general, the reactive hot-melt adhesive element according to the present invention based on hot-melt adhesives has proven itself when the latter is put under pressure during and/or after initiation of cross-linking. This ensures strong, permanent and quick adhesive bonds. This kind of pressure application causes the constituents (contents) to become intensively mixed, and hence produces a uniform cross-linking, in particular given an alternating pressure application, e.g. a milling-type pressure application of a reactive hot-melt adhesive element according to the present invention in the form of a strip when passing through several pressure rollers.

As described above, cross-linking preferably takes place at temperatures of about 60° C. to 160° C. In particular the use of a catalyst ensures a reliable melting-on of the individual constituents (contents), and hence the initiation of cross-linking. In the case of solid isocyanates, cross-linking takes place in less than 10 minutes, in particular within 5 minutes, at temperatures of 100° C. to 160° C., depending on the type of isocyanate used, the reactivity of the matrix and, if necessary, the type and quantity of catalyst. This ensures a quick and efficient adhesive bond. As an alternative, if the melt is allowed to cool to room-temperature again after initiating the cross-linking process, the reactive hot-melt adhesive of the reactive hot-melt adhesive element according to the present invention cross-links within 5 to 8 days in the case of the solid isocyanates.

According to another aspect of the present invention, the present invention also relates to an adhesive bonding or joining process for the permanent bonding of joining of parts or substrates, said adhesive bonding or joining process using the reactive hot-melt adhesive material according to the present invention.

According to a first embodiment, said adhesive bonding or joining process according to the present invention for permanently bonding parts or substrates using the reactive hot-melt adhesive element according to the present invention comprises the following steps:

a) Providing a first and second part/substrate and a reactive hot-melt adhesive element according to the present invention;

b) Applying the reactive hot-melt adhesive element according to the present invention to the first of the two parts/substrates, in particular during exposure to heat and/or pressure, if necessary while melting the reactive constituents and thereby initiating the cross-linking process;

c) Joining the first and second part/substrate while applying the second part/substrate on the side of the first part/substrate provided with the reactive hot-melt adhesive element, preferably under pressure;

d) Pressing together the two parts/substrates, if necessary initiating the cross-linking process (if not already done in step b)), in particular during exposure to heat and/or moisture; and finally e) Hardening or curing, if necessary during exposure to pressure and/or heat and/or moisture.

According to a second embodiment, said adhesive bonding or joining process according to the present invention for permanently bonding parts or substrates using the reactive hot-melt adhesive element according to the present invention comprises the following steps:

a) Providing a first and second part/substrate and a reactive hot-melt adhesive element according to the present invention;

b) Joining the first and second part/substrate with the reactive hot-melt adhesive element positioned therebetween;

c) Pressing together the two parts/substrates joined together in step b), in particular during exposure to heat and, if necessary, moisture, preferably while melting the reactive constituents and thereby initiating the cross-linking process; and finally d) Hardening or curing, if necessary during exposure to pressure and/or heat and/or moisture.

Exposure to heat can be accomplished with a heater, ultrasound, high frequency, microwave irradiation, laser irradiation, infrared irradiation or by heating up the parts/substrates to be bonded.

As describe above, it may be advantageous for the reactive hot-melt adhesive element according to the present invention to also contain additives for improving the heat conductivity and/or sensitivity to radiation induction, in particular relative to microwave and high-frequency radiation (e.g. silver powder or polyaniline), since in the heat-inducing cross-linking process, in particular via microwave or high-frequency irradiation, the input energy can be used particularly efficiently.

In particular, the adhesive bonding process according to the present invention can be carried out in an automated, preferably continuous operation.

For example, parts or substrates made out of wood, plastics etc. can be adhered together using the adhesive bonding process according to the present invention. Examples include wood profiles, in particular furniture parts.

For example, the process according to the present invention is suitable for applying edge bands on wood profiles, e.g. in particular furniture parts. Equipment of the kind known from prior art is suitable for the automated execution of the process according to the present invention for such applications.

Further embodiments and variations of the present invention may be easily thought of or realized by the skilled practitioner when reading the present specification, without him going beyond the present invention.

The present invention will be illustrated on the basis of the following Examples, which do not limit the present invention in any way, however.

EXAMPLES

Example 1

Manufacture of a Reactive Hot-melt Adhesive Element According to the Present Invention Using an Isocyanate which is Solid at Room-temperature Into a heatable and evacuable boiler, 58 kg of hexanedioladipate (Dynacoll® 7360, Degussa-Hüls AG) and 31 kg of hydrocarbon resin (Novares® TM 80, VFG AG) are prepared, heated to 140° C. and homogeneously mixed.

0.5 kg of 2-methylpentamethylenediamine (Dytek® A, Du Pont) are subsequently added at 70 to 90° C. After another 10 minutes, 10 kg of dimeric 1-methyl-2,4-phenylene-diisocyanate (Desmodur® TT, Bayer AG) are added. After homogeneous mixing, 0.6 kg of pentaerythrite, 0.4 kg of idazabicyclooctane and 0.1 kg of bismuth organyl (Coscat® 83, Erbslöh company) are added, after which the mixture is evacuated and blended for 30 minutes.

The melt is then conveyed via a slot nozzle to a steel belt, onto which the melt is spread as a film, and then rolled up after being cooled. The resulting reactive hot-melt adhesive element according to the present invention has the following technical characteristics:

| | |
|---|---|
| Melting range (Kofler hot stage): | 60 to 65° C. |
| Viscosity (Brookfield, Sp 28, 50 RPM) 80° C.: | approx. 4,500 mPas |
| Hardening under heat (100 μm film thickness, Kofler hot stage): | >160° C.: approx. 10 seconds |
| Time until melt hardens at a specific temperature: | 140° C.: approx. 30 seconds |
| | 130° C.: approx. 2 minutes |
| | 120° C.: approx. 3–4 minutes |
| Stability of viscosity at 80° C.: | >>8 hours |

Example 2

Manufacture of a Reactive Hot-melt Adhesive Element According to the Present Invention Using an Isocyanate which is Liquid at Room-temperature A mixture of 200 parts of a polyester polyol based on pentaerythrite, monoethylene glycol, hexane diol and hexane diacid with a molecular weight of approx. 5,500 and an OH number of approx. 20 (Dynacoll® 7250) and 100 parts of a polyester polyol based on neopentyl glycol, monoethylene glycol, isophthalic acid and terephthalic acid with a molecular weight of approx. 2,600 and an OH number of approx. 42 (Dynacoll® 7150) and 200 parts of a polyester polyol based on hexane diol and adipic acid with a molecular weight of approx. 4,000 and an OH number of approx. 28 (Dynacoll® 7360) and 200 parts of a polyester polyol based on hexane diol and a mixture of terephthalic, isophthalic and sebacic acid with a molecular weight of approx. 25,000 and an OH number of approx. 4,5 (Dynacoll® S 1401) and 200 parts of a low-molecular synthetic resin from the group of α-methylstyrene resins (Sylvarez® S 600) are prepared in a suitable mixing vessel and heated to 140° C.

After homogenizing and dewatering, the charge is cooled to 100 to 120° C., and 100 parts of the isocyanate consisting of a mixture of 4,4'-diisocyanatodiphenylmethane and 2,4'-diisocyanatodiphenylmethane, wherein the amount of 2,4'-diisocyanatodiphenylmethane in the mixture exceeds 50% w/w (Desmodur® VP KA 8616 from Bayer AG), are added while blending. The charge is kept for two hours at 100 to 120° C. The resulting reactive hot-melt adhesive has an isocyanate content of 2.1 to 2.3% w/w, a viscosity of approx. 25,000 at 120° C. (Brookfield Thermosel), and a softening range in a non-cross-linked state of 55 to 65° C. (Kofler hot stage).

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

We claim:

1. A self-supporting reactive hot-melt adhesive element comprising:
a reactive one-component hot-melt adhesive which is solid at room-temperature, wherein said reactive one-component hot-melt adhesive comprises:
(i) 0.5 to 30% w/w relative to the reactive hot-melt adhesive element of at least one free non-blocked isocyanate which is solid or liquid at room-temperature, said at least one isocyanate being selected from the group consisting of:
(a) unsymmetrically substituted aliphatic and aromatic di- and polyisocyanates comprising isocyanate functions of different reactivity, and
(b) a mixture of at least two isocyanates selected from the group consisting of aliphatic and aromatic di- and polyisocyanates which are solid or liquid at room temperature wherein at least one of said di- and polyisocyanates of said mixture is an unsymmetrically substituted di- or polyisocyanate comprising isocyanate functions of different reactivity;
(ii) 20 to 90% w/w relative to the reactive hot-melt adhesive element of at least one isocyanate-reactive polymer and/or resin which is solid at room-temperature; and
(iii) at least one non-isocyanate-reactive polymer, wax and/or resin wherein the maximum amount of said at least one non-isocyanate reactive polymer, wax and/or resin is 60% w/w relative to the reactive hot-melt adhesive element;
wherein the content of free NCO-groups in said reactive hot-melt adhesive element is at least 0.5% w/w relative to the reactive hot-melt adhesive element;
wherein said at least one non-isocyanate-reactive polymer, wax, and/or resin combines with said at least one isocyanate-reactive polymer and/or resin to form a matrix into which said at least one isocyanate is incorporated in homogenous distribution; and
wherein the cross-linking of said self-supporting reactive hot-melt adhesive element takes place at temperatures of from 60° C. to 160° C.

2. The reactive hot-melt adhesive element of claim 1, wherein the content of free NCO-groups in said reactive hot-melt adhesive element is at least 1% w/w, relative to the reactive hot-melt adhesive element.

3. The reactive hot-melt adhesive element of claim 1, wherein said least one isocyanate is a mixture of 4,4'-diisocyanatodiphenylmethane and 2,4'-diisocyanatodiphenylmethane, having a content of 2,4'-diisocyanatodiphenylmethane exceeding 20% w/w, relative to the isocyanate mixture.

4. The reactive hot-melt adhesive element of claim 1, wherein said at least one isocyanate-reactive polymer and/or resin comprises at least two isocyanate-reactive groups or isocyanate-reactive hydrogen atoms per molecule.

5. The reactive hot-melt adhesive element of claim 1, wherein said least one isocyanate-reactive polymer and/or resin has an average molecular weight exceeding 8,000 g/mol, and/or said least one isocyanate-reactive polymer and/or resin is selected from the group consisting of isocyanate-reactive polymers and copolymers.

6. The reactive hot-melt adhesive element of claim 1, further comprising at least one catalyst, in amounts of from 0.01 to 5% w/w relative to the reactive hot-melt adhesive element, said catalyst being homogenously distributed over said least one isocyanate-reactive polymer anchor resin matrix and embedded herein, said catalyst being selected from the group consisting of organic tin compounds; organic iron, lead, cobalt, bismuth, antimony and zinc compounds and mixtures of these compounds; and catalysts based on amines.

7. The reactive hot-melt adhesive element of claim 1, wherein said non-isocyanate-reactive polymer, wax and/or resin is selected from the group consisting of:
(i) aliphatic, cyclic or cycloaliphatic hydrocarbon resins, terpene phenol resins, cumarone indene resins, a-methylstyrene resins, polymerized liquid resin esters and ketonaldehyde resins, with low acid values of less than 1 mg KOH/g;
(ii) ethylene/vinyl acetate polymers and copolymers, with vinyl acetate contents of between 12 and 40% w/w and/or with melt indices (MIFIs, DIN53735) of 8 to 800;
(iii) polyolefins, with average molecular weights of 5,000 to 25,000 g/mol, and/or with ring and ball softening ranges of between 80 and 170° C.;
(iv) (meth)acrylates; and
(v) polyolefin waxes; and mixtures of these compounds.

8. The reactive hot-melt adhesive element of claim 1, further comprising at least one isocyanate-reactive mono-functional additive, in an amount of from 0 to 20% w/w relative to the reactive hot-melt adhesive element, said least one mono-functional additive being selected from the group consisting of mono-functional amines, alcohols, mercaptans and mono-functional additives which comprise an isocyanate-reactive functional group.

9. The reactive hot-melt adhesive element of claim 1, wherein the individual constituents or contents are embedded and homogenously distributed in each other.

10. The reactive hot-melt adhesive element of claim 1, wherein said adhesive element is non-sticky or non-adhesive at room-temperature and becomes sticky or adhesive at temperatures above room-temperature, and begins to cross-link at temperatures of from 60° C. to 160° C., and wherein the duration of cross-linking is less than 10 minutes.

11. The reactive hot-melt adhesive element of claim 1, wherein when the cross-linking process has been initiated via heating to a temperature of from 100° C. to to 160° C., followed by immediate cooling to room-temperature, the duration of cross-linking is for about 5 to 8 days at room-temperature.

12. The reactive hot-melt adhesive element of claim 1, wherein said adhesive element cross-links during exposure to heat and moisture.

13. The reactive hot-melt adhesive element of claim 1, having a layer thickness of 10 µm to 1,000 µm.

14. The reactive hot-melt adhesive element of claim 1, in the form of a foil, film, strip or reactive adhesive tape, which may optionally be wound into a roll and/or stored in a cassette.

15. The reactive hot-melt adhesive element of claim 1, further comprising:
up to 25% w/w of at least one additive for improving heat conductivity and/or sensitivity to radiation induction;
said amounts being based on the reactive hot-melt adhesive element.

16. A process for manufacturing the reactive hot-melt adhesive element of claim 1, said process comprising:
a) mixing the individual constituents or contents, without a reaction between the individual constituents or contents taking place in the case of a solid isocyanate;
b) optionally, cooling or permitting to cool the resulting mixture or mass until said mixture or mass cools and/or hardens;
c) processing the mixture or mass to a film, optionally with heating to above room-temperature, but without a reaction between the individual constituents or contents taking place;
d) optionally, cooling or permitting the film to cool to room-temperature; and
e) optionally, further processing the film, into foils, or smaller pieces etc. and/or winding into rolls.

17. An adhesive bonding process for the permanent bonding of substrates to be joined, comprising:
a) providing a first and a second substrate to be bonded;
b) applying the reactive hot-melt adhesive element of claim 1 to at least a region of the first substrate, during exposure to heat and/or pressure, optionally while melting the reactive constituents and thereby initiating the cross-linking process;
c) joining said first and second substrates while contacting said second substrate with at least the region of the first substrate provided with the reactive hot-melt adhesive element;
d) pressing together said two substrates, while initiating the cross-linking process, during exposure to heat and/or moisture; and thereafter;
e) hardening or curing, optionally during exposure to pressure and/or heat and/or moisture.

18. An adhesive bonding process for the permanent bonding of substrates to be joined, comprising:
a) providing a first and a second substrate to be bonded and the reactive hot-melt adhesive element according to claim 1;
b) joining said first and second substrate with said reactive hot-melt adhesive element being positioned between said first and second substrates;
c) pressing together said first and second substrates joined together in step b), during exposure to heat and/or moisture, while melting the reactive constituents and thereby initiating the cross-linking process; and thereafter
d) hardening or curing, optionally during exposure to pressure and/or heat and/or moisture.

19. A self-supporting reactive hot-melt adhesive element, comprising:
a reactive one-component hot-melt adhesive which is solid at room-temperature, wherein said reactive one-component hot-melt adhesive comprises:
(i) 0.5 to 30% w/w relative to the reactive hot-melt adhesive element of a mixture of at least two free non-blocked aliphatic and/or aromatic di- and/or polyisocyanates which are solid or liquid at room-temperature wherein at least one of said di-and/or polyisocyanates in said mixture is an unsymmetrically substituted di- and/or polyisocyanate comprising isocyanate functions of different reactivity, wherein said isocyanate mixture comprises a mixture of 4,4'-diisocyanatodiphenylmethane and 2,4'-diisocynatodiphenylmethane, the content of 2,4'-diisocyanatodiphenylmethane exceeding 20% w/w, relative to the isocyanate mixture;
(ii) 20 to 90% w/w relative to the reactive hot-melt adhesive element of at least one isocyanate -reactive polymer and/or resin which is solid at room-temperature; and
(iii) at least one non-isocyanate-reactive polymer, wax and/or resin wherein the maximum amount of said non-isocyanate-reactive polymer, wax and/or resin is 60% w/w relative to the reactive hot-melt adhesive element;

wherein the content of free NCO-groups in said reactive hot-melt adhesive element is at least 0.5% w/w relative to the reactive hot-melt adhesive element; and wherein said at least one non-isocyanate-reactive polymer, wax and/or resin combines with said at least one isocyanate-reactive polymer and/or resin to form a matrix into which said at least one isocyanate is incorporated in homogenous distribution.

20. A process for manufacturing the reactive hot-melt adhesive element of claim 19, said process comprising:

a) mixing the individual constituents or contents, without a reaction between the individual constituents or contents taking place in the case of a solid isocyanate;

b) optionally, cooling or permitting to cool the resulting mixture or mass until said mixture or mass cools and/or hardens;

c) processing the mixture or mass to a film, optionally with heating to above room-temperature, but without a reaction between the individual constituents or contents taking place;

d) optionally, cooling or permitting the film to cool to room-temperature; and e) optionally, further processing the film, into foils, or smaller pieces etc. and/or winding into rolls.

21. An adhesive bonding process for the permanent bonding of substrates to be joined, comprising:

a) providing a first and a second substrate to be bonded;

b) applying the reactive hot-melt adhesive element of claim 19 to at least a region of the first substrate, during exposure to heat and/or pressure, optionally while melting the reactive constituents and thereby initiating the cross-linking process;

c) joining said first and second substrates while contacting said second substrate with at least the region of the first substrate provided with the reactive hot-melt adhesive element;

d) pressing together said two substrates, while initiating the cross-linking process, during exposure to heat and/or moisture; and thereafter;

e) hardening or curing, optionally during exposure to pressure and/or heat and/or moisture.

22. An adhesive bonding process for the permanent bonding of substrates to be joined, comprising:

a) providing a first and a second substrate to be bonded and the reactive hot-melt adhesive element according to claim 19;

b) joining said first and second substrate with said reactive hot-melt adhesive element being positioned between said first and second substrates;

c) pressing together said first and second substrates joined together in step b), during exposure to heat and/or moisture, while melting the reactive constituents and thereby initiating the cross-linking process; and then d) hardening or curing, optionally during exposure to pressure and/or heat and/or moisture.

* * * * *